US00RE35625E

United States Patent [19]

Roberts

[11] E Patent Number: Re. 35,625

[45] Reissued Date of Patent: Oct. 7, 1997

[54] PROCESS FOR MAKING A CHEMICALLY-RESISTANT PORCELAIN ENAMEL

[75] Inventor: Thomas R. Roberts, Rochester, N.Y.

[73] Assignee: Pfaudler, Inc., Rochester, N.Y.

[21] Appl. No.: 524,219

[22] Filed: Sep. 6, 1995

Related U.S. Patent Documents

Reissue of:

[64] Patent No.: 5,387,439
Issued: Feb. 7, 1995
Appl. No.: 228,595
Filed: Apr. 15, 1994

[51] Int. Cl.[6] ..... B05D 3/02

[52] U.S. Cl. ..... 427/376.2; 427/419.4; 427/419.6

[58] Field of Search ..... 427/376.2, 419.4, 427/419.6

[56] References Cited

U.S. PATENT DOCUMENTS

| | | | |
|---|---|---|---|
| 2,563,502 | 8/1951 | Sweo | 106/48 |
| 4,407,868 | 10/1983 | Iizawa | 427/376.2 |
| 4,975,391 | 12/1990 | Shimizu et al. | 501/21 |

*Primary Examiner*—Benjamin Utech
*Attorney, Agent, or Firm*—Michael L. Dunn

[57] ABSTRACT

A process for preparing a chemically resistant coating in which a substrate is sequentially contacted with a ground coat, fired, contacted with an intermediate coat, fired, and contacted with a cover coat and fired. The intermediate coat is comprised of a minor amount of inorganic fiber which has a softening point in excess of 950 degrees Centigrade, an average length of from about 100 to about 750 microns, an average diameter of from about [515] *5–15* microns, and an average aspect ratio of from about 10:1 to about 75:1.

15 Claims, 2 Drawing Sheets

PROCESS FOR MAKING A CHEMICALLY-RESISTANT PORCELAIN ENAMEL

Matter enclosed in heavy brackets [ ] appears in the original patent but forms no part of this reissue specification; matter printed in italics indicates the additions made by reissue.

FIELD OF THE INVENTION

A process for preparing a chemically-resistant porcelain enamel with a high impact resistance in which an inorganic fiber-containing slip is used to prepare one layer of the enamel.

BACKGROUND OF THE INVENTION

U.S. Pat. No. 2,563,502 of Benjamin J. Sweo discloses a process for preparing a fired coating of porcelain enamel which utilizes a ceramic slip containing non-metallic inorganic fibrous material. The fibers used in the Sweo process have a length of from about 20 to about 100 microns (see lines 28–31 of column 2).

The process of the Sweo patent, however, does not produce a fired coating with sufficient impact resistance. Thus, in his U.S. Pat. No. 4,407,868 (and in the documents contained in the file history of such patent), Yoshirhiro Iizawa discloses that it is essential to use substantially longer fibers than those used in the Sweo process. Thus, e.g., in a "DECLARATION UNDER RULE 132" signed on Dec. 21, 1982, Iizawa discussed a test in which two types of glass lined specimens (Specimens A and B) were prepared. Specimen A contained fibers having a diameter of 10 microns and a length of 100 microns in an amount of 5% by weight (in accordance with the teaching of Sweo U.S. Pat. No. 2,563,502). Specimen B contained fibers having a diameter of 100 microns and a length of 1,000 microns in an amount of 5 weight 1 percent. Both specimens were tested for impact resistance.

On the last page of his "DECLARATION . . . ," Iizawa stated that ". . . the reinforcing effect by fibers of Specimen A containing fibers having a length of 100 microns (Sweo's Patent) was about one tenth of that of Specimen B containing fibers having a length of 1,000 microns . . . ."

As a result of this disclosure, Iizawa's patent application was allowed with claims calling for the use of a slip comprised of inorganic fibers with a length of from 1 to 5 millimeters.

Although the coatings produced by the Iizawa process reportedly have better impact resistance than those produced by the Sweo process, they have poor chemical resistance. Thus, e.g., the coatings of the Iizawa patent, when exposed to hydrochloric acid in a 20 volume percent vapor phase, lose from about 0.9 to about 1.0 grams of weight per square meter per day (see TABLE 7). This weight loss due to exposure to acid is unacceptably high for chemical processing equipment.

It is an object of this invention to provide a process for producing a chemically resistant porcelain enamel coating with good impact resistance and acid resistance which is substantially superior to that possessed by the coatings of the Iizawa patent.

It is another object of this invention to provide a chemically-resistant porcelain enamel in which crack propagation is minimized.

It is yet another object of this invention to provide a process for preparing a chemically-resistant porcelain enamel coating which is substantially smoother than many prior art enamel coatings. This property will facilitate non-adhesive contact between the enamel coating and polymeric/elastomeric bodies which often occurs during chemical reactions.

SUMMARY OF THE INVENTION

In accordance with this invention, there is provided a process for preparing a chemically-resistant porcelain enamel coating. In the first step of this process, a steel substrate is coated with a first ground coat *comprising glass particles* and, thereafter, is fired. In the second step of the process, the coated and fired substrate is then coated with a slip comprised of *glass particles (frit) and* amorphous inorganic fibers with a specified aspect ratio, and the substrate is then fired again. Finally, a top coat is applied to the fired substrate, and the substrate is fired for a third time.

BRIEF DESCRIPTION OF THE DRAWINGS

The invention will be illustrated by reference to the following Figures, in which like reference numerals refer to like elements, and in which.

DESCRIPTION OF THE PREFERRED EMBODIMENTS

In one preferred embodiment, the process of this invention may be used with glass lined steel process equipment for the metallurgical, chemical, pharmaceutical, food and beverage industries. The process, when used with such equipment, produces a composite enamel coating with substantially improved chemical resistance and impact strength.

Enamel processing equipment generally suffers from intense sensitivity to impact. Mechanical impact upon the enameled surface of a reactor of this type often results in the need for extensive repair or complete reglassing of the vessel.

In the preferred process of the present invention, (1) the substrate is prepared, (2) a ground coat slip is prepared and coated onto the substrate, (3) an intermediate coating is prepared into which are milled amorphous inorganic fibers, (4) and finally a chemically resistant cover coat is applied over the top of the whisker containing intermediate coat. The resultant coating often renders the enamel composite film more resistant to impact.

In this preferred embodiment, the article of processing equipment, which often consists essentially of steel, is manufactured and properly prepared by sand or grit blasting to remove rust oxides and any scale which might have developed on the surface of the substrate during manufacture. Grits of silica or aluminum oxide are preferred for this preparation.

A suitable ground coat, described elsewhere in this specification, is then prepared. The ground coat is then applied to the metal substrate rendering a fired film thickness of 0.010 to 0.020 inches. In one especially preferred embodiment, the ground coat has a firing temperature at or around 1580° F.

The second layer of the composite is then prepared. In one preferred embodiment, a specified slurry comprised of *glass*

*frit and* inorganic fibers is prepared and sprayed onto the substrate which in the previous operation had been coated with the ground coat enamel. The thickness of the whisker enriched layer when fired should preferably yield a thickness of 0.015 to 0.025 inches on top of the ground coated layer. The total thickness of the film is now preferably between 0.030 and 0.040 inches.

The firing temperature for this coating is preferably between 1472° and 1508° F. for a period of time satisfactory to effect vitrification of the dried slip coating.

Following the application and vitrification of the intermediate coating, a cover coat slip is prepared and fused to the surface of the substrate. The resulting slip is then sprayed onto the intermediate layer, preferably using a normal air elutriated spraying apparatus to accomplish the task. The process equipment is then preferably fired at a temperature between 1450° and 1475° F. A fired film thickness of the resultant cover coat is 0.015 to 0.025 inches is achieved in this manner.

DESCRIPTION OF THE PROCESS ILLUSTRATED IN THE FLOW DIAGRAM

Figure 1:
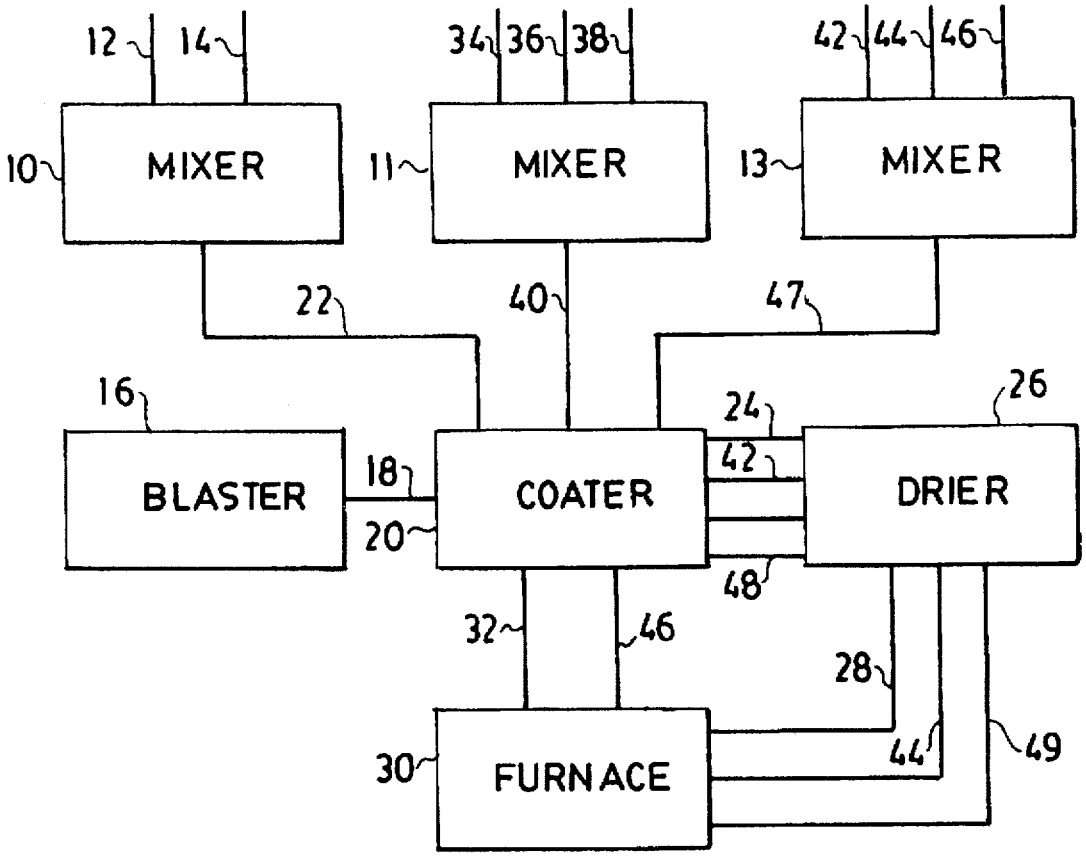
FIG. 1 is a flow diagram of one preferred process of the invention.

FIG. 1 is a flow diagram illustrating one preferred embodiment of the process of this invention. In the first step of the process depicted in FIG. 1, a ground coat, an intermediate coat, and a top coat are each prepared in mixers 10, 11, and 13, respectively.

The ground coat used in the process of this invention may be prepared in mixer 10. As is known to those skilled in the art, a ground coat is an alkali borosilicate glass composition which is used to develop high adherence between the substrate and subsequent coatings on the substrate.

Ground coat compositions useful in the present invention typically contain from about 10 to about 20 weight percent of boric oxide, from about 40 to about 60 weight percent of silica, and from about 15 to about 25 weight percent of alkali metal oxide(s) selected from the group consisting of the oxides of lithium, sodium, potassium, rubidium, cesium, francium, and mixture thereof.

Referring to FIG. 1, and in the preferred embodiment illustrated therein, it will be seen that a suitable ground coat composition may be prepared in mixer 10. Although substantially any conventional mixer may be used, it is preferred that mixer 10 in addition to mixing also be able to comminute the materials being mixed.

Thus, in one preferred embodiment, mixer 10 is a tumbling mill such as, e.g., a tube mill, a compartment mill, a rod mill, a pebble mill, a ball mill, and the like. See, e.g., pages 8–25 to 8–28 of Robert H. Perry et al.'s "Chemical Engineers' Handbook," Fifth Edition (McGraw-Hill Book Company, New York, (1973).

Referring again to FIG. 1, the glass batch mixture for the ground coat is charged via line 12, and the liquid (which usually is water) is charged via line 14. In general, a sufficient amount of liquid is charged so that [the] a slurry containing from about 60 to about 70 weight percent of solid material is formed. Milling of this slurry is continued until a substantially homogeneous mixture with a particle size distribution such that at least five weight percent of the particles in the slurry are smaller than 44 microns and at least about 20 weight percent of the particles in the slurry are larger than 150 microns is produced. Samples may be periodically removed from the mixer 10 and subjected to particle size analysis in a laboratory (not shown) to determine whether the slurry has the desired particle size distribution. See, for example, U.S. Pat. No. 4,282,006 for a discussion of the measurement of particle size distribution; the disclosure of this patent is hereby incorporated by reference into this specification.

In one preferred embodiment, the glass batch charged via line 12 preferably contains from about 48 to about 58 weight percent (by total weight of the glass batch, dry basis) of silica, from about 12 to about 22 weight percent of boric oxide, from about 9 to about 19 weight percent of sodium oxide, from about 1 to about 9 weight percent of potassium oxide, and from about 1 to about 9 weight percent of alumina. In addition, this glass batch also may contain from about 1 to about 6 weight percent of calcium fluoride, from about 0.2 to about 6 weight percent of cobalt oxide, from about 0.2 to about 4 weight percent of nickel oxide, and from about 0.2 to about 3 weight percent of manganese oxide.

As is known to those skilled in the art, in addition to the glass batch, one may also charge various suspending agents, electrolytes, and other materials and fluids to mixer 10; see, e.g., pages 360–365 of the aforementioned Andrews text.

In a separate step, illustrated in FIG. 1, the surface of the substrate to be coated is prepared in blaster 16. In general, the substrate to be coated is a ferrous metal or alloy thereof such as those materials disclosed on pages 23–45 to 23–46 of the aforementioned Perry and Chilton "Chemical Engineers' Handbook." Thus, for example, the substrate may consist essentially of Inconel Alloy 600, Inconel Alloy 610, Inconel Alloy 625, Inconel Alloy 700, Inconel Alloy 702, Inconel Alloy 705, Inconel Alloy 713, Inconel Alloy 721, Inconel Alloy 722, Inconel Alloy X-750, and the like.

In one embodiment, the substrate is a cold-rolled low-carbon steel which contains less than 0.25 weight percent of carbon. Thus, as is disclosed in A.S.M.E. Specification SA285, Grade B, or SA285M-82, Grade B, this steel preferably contains no more than 0.22 weight percent of carbon, no more than 0.9 weight percent of manganese, no more than 0.035 weight percent of phosphorous, no more than 0.04 weight percent of sulfur, and at least about 98 weight percent of iron.

The surface of the substrate often contains many imperfections, especially after it has been fabricated and is being finished or refinished. Thus, it is desired to prepare such surface by mechanical blasting to remove imperfections such as oxides, scales, pits, tool marks, etc.

In one embodiment, it is preferred to prepare the surface of the substrate by blasting. As is disclosed on pages 198 to 211 of the aforementioned Andrews text, one may prepare such surface by mechanical blasting, by compressed air blasting, and the like. One may use conventional abrasives such as sand, steel grit, alumina grit, and the like. In one preferred embodiment, alumina grit with a particle size smaller than 40 mesh is used.

The surface preparation treatment in blaster 16 is continued until visual inspection reveals that the surface of the substrate has a clean, uniform grey appearance, indicating that it has been cleaned sufficiently to promote adherence between the enamel and the substrate. Thereafter, the prepared substrate is conveyed via line to coater 20, in which the coating from mixer 10 is applied to it.

The slurry from mixer 10 is then applied to the prepared substrate in coater 20, being passed to such coater by line 22. The slurry is applied to the prepared substrate by conventional means such as, e.g., spraying.

The preferred means of applying the slurry to the prepared substrate is by spraying. Any conventional spraying means may be used; see, e.g., pages 394 to 403 of the aforementioned Andrews reference.

It is preferred to apply the slurry to the prepared substrate in such a manner that one obtains a uniform thickness after firing of from about 0.25 millimeters to about 0.5 millimeters. To achieve this goal, in general a wet film of from about 0.3 to about 0.75 millimeters is preferably applied to the substrate.

The coated substrate may then be passed via line 24 to drier 26, wherein the substrate is dried to a moisture content of less than about 10 weight percent. The substrate may be air dried or force dried in an oven.

The dried substrate is then passed via line 28 to furnace 30, wherein it is fired. The dried substrate is subjected to a temperature in furnace 30 of from about 810 to about 910 degrees Centigrade for from about 20 to about 150 minutes. It is preferred to subject the dried substrate to a temperature of from about 850 to about 880 degrees Centigrade for from about 20 to about 150 minutes.

The fired substrate [in] *is* then passed via line 32 to coater 20, wherein a second, intermediate coat is applied to it.

The intermediate coat may be prepared in mixer 11. Referring to FIG. 1, it will be seen that solid material may be charged to mixer 11 via line 34 and liquid may be charged via line 36. In general, a sufficient amount of each such material is charged so that the slurry formed in mixer 11 has a solids content of from about 60 to about 75 weight percent. The slurry in mixer 11 is comminuted for a time sufficient to produce a particle size distribution such that at least about 10 weight percent of the particles are larger than 150 microns and no more than 10 percent of the particles are smaller than 44 microns.

The solid material charged via line 34, the "frit," is preferably comprised of from about 68 to about 74 weight percent of silica (by dry weight of frit), from about 0.5 to 2.5 weight percent of alumina, from about 7 to about 15 weight percent of sodium oxide, from about 1 to 5 weight percent of lithium oxide, from about 2 to about 9 weight percent of zirconium oxide. In one especially preferred embodiment, the frit contains from about 70 to about 72 weight percent of silica, from about 1 to about 2 weight percent of alumina, from about 11 to about 14 weight percent of sodium oxide, from about 1 to about 3 weight percent of lithium oxide, and from about 2 to about 6 weight percent of zirconium oxide.

In addition to the frit, an inorganic fibrous material is charged via line 38 to mixer 11.

It is preferred that the fiber charged via line 38 have a coefficient of thermal expansion of from about 0 to 20×0.0000001 centimeters per centimeter per degree Centigrade; in one preferred embodiment, the fiber has a coefficient of thermal expansion of from about 4 to about 10×0.0000001 centimeters per centimeter per degree Centigrade. As is known to those skilled in the art, the coefficient of thermal expansion of materials such as fibers may be measured by A.S.T.M. Standard Test E7 in order to determine the change in unit length accompanying a change in temperature.

It is also preferred that the fiber charged via line 38 have a softening point in excess of 950 degrees Centigrade. Furthermore, it is preferred that the fiber used have a substantially circular cross-sectional shape.

Any fibrous material which has the aforementioned properties as well as the dimensions specified below may be used in the process. Thus, by way of illustration and not limitation, one may use amorphous silica fibers, quartz fibers, and the like.

The fiber material used in the process of this invention has an average length of from about 100 to about 750 microns; at least about 90 weight percent of the fibers have a length within this range. The fiber material charged via line 38 need not necessarily have an average length of from about 100 to about 750 microns; however, after comminution in mixer 11, the fibers have both the specified average length and the specified aspect ratio described below.

The fiber material used in the process of this invention has an average diameter of from about 5 to about 15 microns and, more preferably, from about 8 to about 13 microns; as before, at least about 90 weight percent of the fibers, after comminution, have an average diameter within such range.

The aspect ratio of the fiber material used in the process of this invention is the ratio of the length of the fiber to its diameter. The average aspect ratio of the fiber material used in the process (the aspect ratio of at least about 90 weight percent of the fibers) is from about 10:1 to about 75:1 and, more preferably, from about 15:1 to about 25:1.

In one preferred embodiment, the particular fiber material used in the process is amorphous silica fiber. This material is commercially available as "Refrasil" Standard Fiber F100-A25 from the Carborundum Corporation of Niagara Falls, N.Y. The material typically contains 97.9 weight percent of silica and has an average length of 0.25 inches and average diameter of 0.0004 inches.

In general, it is preferred that the fiber material be amorphous (i.e., that it contain no long range crystallinity) and that such material contain at least about 95 weight percent of silica.

Referring again to FIG. 1, a sufficient amount of said fiber material may be charged to mixer 11 via line 38 so that from 2 to about 10 weight percent (by total weight of solid material charged via lines 34 and 38) is present in the mixer 11. It is preferred to charge from about 2 to about 10 weight percent of the fiber material via line 38.

In addition to the fiber material, one may also charge via line 38 suspending agent and/or electrolyte. The function of the suspending agent is to maintain the ground frit in suspension; and one may use any of the commercially available montmorillonitic type clays. Generally, from about 0.1 to about 0.6 weight percent of such suspending agent(s), by weight of solid material, may be used.

Any conventional electrolyte (such as potassium chloride, barium chloride, aluminum chloride, calcium chloride, and the like) may be used. In general, from about 0.02 to about 0.6 weight percent of such electrolyte (by weight of dry solid material) may be used.

The slurry in mixer 11 is comminuted and then passed via line 40 to coater 20, wherein it is used to coat the once-fired substrate in the manner described elsewhere in this specification. In general, a wet coating with a wet film thickness of from about 0.75 to about 1.5 millimeters is applied to the once-fired substrate in order to obtain a fired thickness for this second layer of from about 0.5 to about 1.0 millimeter.

In one embodiment, the fired coating produced from the slurry of mixer 11 has a coefficient of thermal expansion of from about 85 to 89×0.0000001 centimeters per centimeter per degree centigrade. In this embodiment, the substrate to be coated may be, e.g., a concave surface such as, e.g., the inside of a reactor vessel. In another embodiment, the fired coating produced from the slurry of mixer 11 has a coefficient of thermal expansion of from about 100 to 105× 0.0000001 centimeters per centimeter per degree centigrade. In this embodiment, the substrate to be coated may be a convex surface such as, e.g., the blade of an agitator.

Referring again to FIG. 1, the second coated substrate is then passed via line 42 to drier 26, wherein it is dried to a moisture content of less than about 10 weight percent. Thereafter, the dried substrate is passed via line 44 to furnace 30, wherein it is subjected to a temperature of from about 750 to about 850 degrees Centigrade for a period of from about 20 to about 150 minutes. It is preferred to fire the substrate at a temperature of from about 780 to about 820 degrees Centigrade.

The fired article from furnace 30 is then passed via line 46 to coater 20, wherein it is then coated with a top coat composition produced in mixer 13.

In one embodiment, the top coat composition produced in mixer 13 is substantially identical to the intermediate coat composition produced in mixer 11 with the exception that such composition contains no inorganic fibrous material. In this embodiment, substantially the same amount and type of solid material that was charged in line 34 is now charged in line 42, and the same amount and type of liquid material that was charged in line 36 is now charged in line 44. The same amount and type of suspending agent and electrolyte that was charged in line 38 is now charged in line 46. The only substantial difference between the coat compositions is that the slurry in mixer 13 contains no fibrous material.

Referring again to FIG. 1, substantially the same conditions are used in applying the top coat as were used in applying the intermediate coat via line 47 through coater 20. Thereafter, the thrice coated substrate is passed via line 48 to drier 26 and, after drying, to furnace 30 via line 49, wherein it is subjected to a temperature of from about 740 to about 840 degrees Centigrade for from about 20 to about 150 minutes. It is preferred that the firing temperature used in this firing step be at least about 10 degrees Centigrade lower than the temperature used to fire the intermediate coat.

Figure 2:
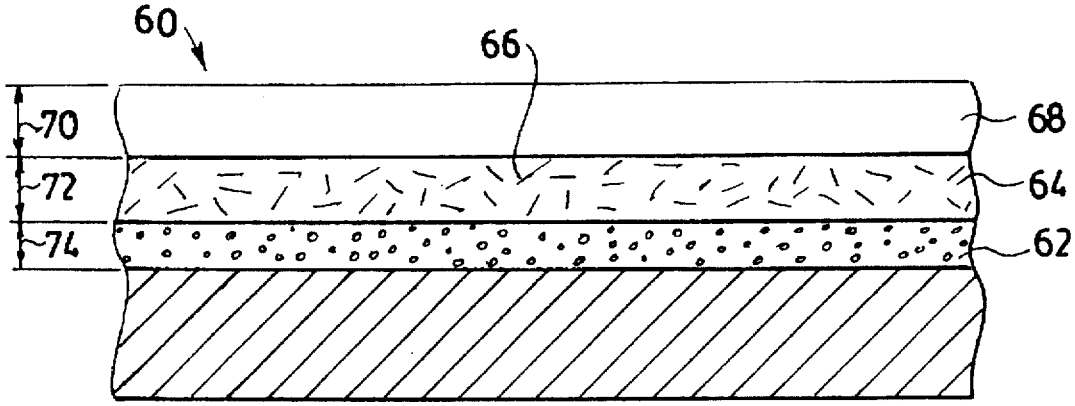
FIG. 2 is an enlarged sectional view of a coated substrate produced by the process of this invention.

FIG. 2 is an enlarged sectional view of a preferred coated substrate produced by the process of this invention. Referring to FIG. 2, it will be seen that substrate 60 is comprised of a first ground coat, an intermediate coat 64 (which contains uniformly dispersed throughout such coat fibers 66), and a top coat 68. In this preferred embodiment, the thickness 70 of top coat 68, and the thickness 72 of intermediate coat 64, each exceeds the thickness 74 of ground coat 62. In general, the thickness 70 and the thickness 72 will each be at least about twice as great as the thickness 74. Furthermore, in one embodiment, thickness 70 will be substantially equal to thickness 72.

Procedures for testing the coated substrate

Testing of the chemical, mechanical and thermal properties of the coated substrate may be done in accordance with the procedures described below.

The acid resistance of the coated substrate may be tested in substantial accordance with the test described in U.S. Pat. No. 4,407,868, the entire disclosure of which is hereby incorporated by reference into this specification. The standard test JIS R-4301 discussed in EXAMPLE 6 of such patent is substantially the same test as described in DIN 2743.

When the testing of the coated substrate is done in accordance with DIN 2743 and the substrate is exposed to a vapor of 20 volume percent of hydrochloric acid, the coated enamel loses no more than about 0.3 grams per square meter per day. By comparison, the coated enamel produced in the Iizawa U.S. Pat. No. 4,407,868 loses from about 0.9 to about 2.0 grams per square meter per day (see column 9 of such patent, at TABLE 7). e same test published in Iizawa of 0.9 $gm/m^2/yr$.

The thermal shock properties of the coated substrate may be tested in accordance with A.S.T.M. Standard Test C385-58. The impact resistance of the coated substrate may be determined in accordance with a test which gives quantitative data as to the amount of energy needed to cause failure and, additionally, leaves the test sample in good enough condition that it can be repaired if desired with a small tantalum plug. The method is adaptable to doing tests on actual equipment as well.

Figure 3:
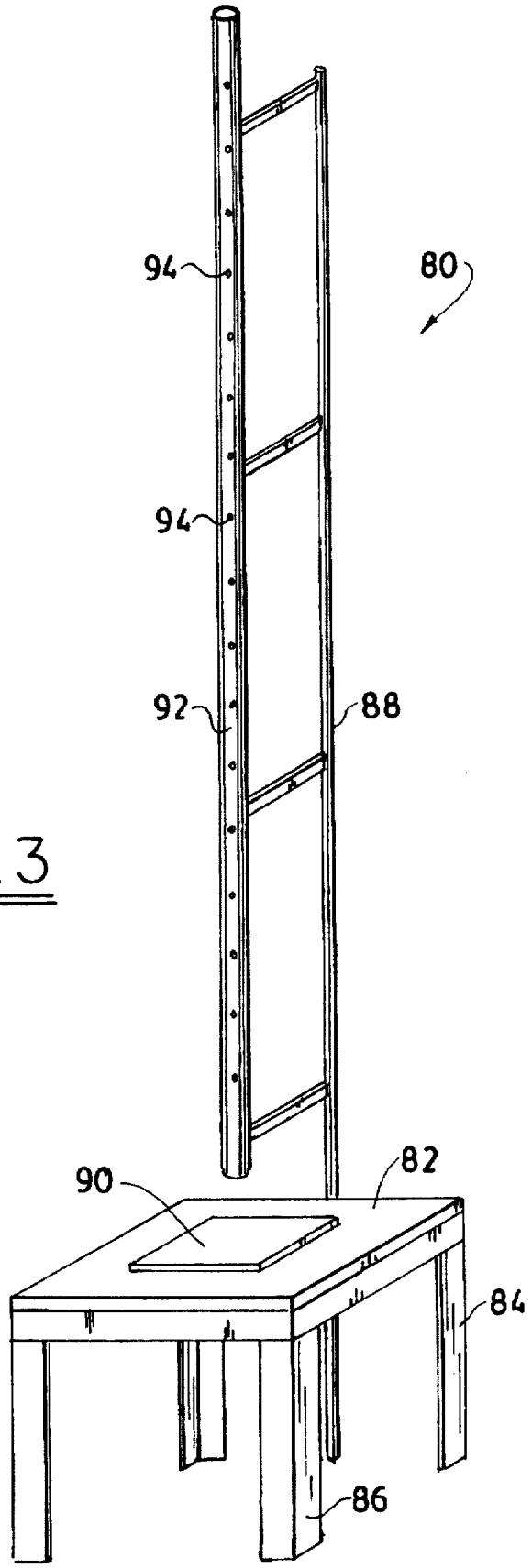
FIG. 3 is an illustration of a test apparatus which may be used to determine the impact resistance of the coating produced by the process of this invention.

The impact resistance test may be conducted with the apparatus illustrated in FIG. 3. Referring to FIG. 3, it will be seen that test apparatus 80 is comprised of a plate 82 made from ½ inch cold rolled steel affixed on the bottom to a frame 84 fabricated from 1½ inch angle iron 86. The plate 82 (or the drop base) is preferably 12 inches square and the top of plate 82 is preferably 12 inches above the floor. The assembly 88 which guides the ball (not shown) to the target 90 (which is a 6" by 6" plate placed on plate 82) is preferably made from 10 feet of 1.125 I.D. polyvinyl chloride schedule 80 tubing 92. The support for this tube 92 is shown in FIG. 3. Along the tube 92, 0.250 inch holes are drilled through the polyvinyl chloride tube to provide a stop for the steel ball at intervals of 15 centimeters from a distance of 15 centimeters above the target plate 90 to the top of the tube. A distance of 15 centimeters separates the bottom of the tube from the top of the target plate 90.

An electrical test apparatus, not shown, also is utilized. The electrical test apparatus is preferably a 20,000 volt alternating current test spark tester supplied by the DeDietrich Co. of Corpus Christi, Tex. This tester will be referred to as 20 KV spark test for the remainder of this description.

In the first portion of this test, one obtains and grit blasts a 6"×6"×½" steel plate made from SA 285 grade B or equivalent. The steel must be of a quality suitable for enamelling and must be consistent if accurate reproducible results are desired. Steels with higher yield points will yield proportionately higher test results.

Thereafter, one should apply the desired coatings to the steel plate as desired by the test procedure required. Place the enamelled plate on the drop base in the desired location. Place the ¼" steel pin into the drop tube and introduce a 1.000 inch steel ball into the top of the tube. When the entire apparatus is at rest, remove the pin from the tube allowing the ball to accelerate downward until it impacts with the target plate. The ball will bounce and should be caught on the first bounce immediately following the impact. This can be done by placing ones hands either side of the tube during the test.

Following each drop, a 20 KV spark test should be made to check for impact damage. The above procedure should be repeated on different areas of the plate until a contact is created by the 20 KV spark test. When a contact occurs, the distance above the target plate is recorded and is used for the calculations of the impact energy.

The equation used for the calculation is the equation for Potential energy:

$$E_p = M \times G \times H$$

Where M=the mass of the ball in grams, G=the gravitational constant 980 cm./sec.$^2$ and H=the height of the ball prior to being dropped on the target plate and expressed in cm. The results are reported in joules.

EXAMPLES

The following examples are presented to illustrate the claimed invention but are not to be deemed limitative thereof. Unless otherwise specified, all parts are by weight and all temperatures are in degrees centigrade.

EXAMPLE 1

To a Curtis Tumbling Mill (manufactured by the Curtis Manufacturing Company) equipped with two two-cubic foot compartments were charged 36.34 parts of feldspar (sold by the General Color and Chemical Company of Minerva, Ohio as "Custer Feldspar), 23.65 parts of dehydrated borax (sold by the U.S. Borax Corporation of Death Valley, Calif. as "anhydrous borax"), 2.16 parts of fluorospar (sold by the General Color and Chemical Corporation as "milled fluorospar"), 2.03 parts of potassium nitrate (sold by the Interstate Chemical Company of West Middlesex, Pa. as "potash niter"), 9.02 parts of sodium carbonate (sold by the Interstate Chemical Company as "soda ash"), 25.11 parts of quartz (sold by the Central Silica Company of Zanesville, Ohio as "glass rock sand"), 0.85 parts of cobalt oxide (sold by the General Color and Chemical Company as "black cobalt oxide"), 0.47 parts of nickel oxide (sold by the General Color and Chemical Company as "green nickel oxide"), and 0.38 parts of manganese oxide (sold by the General Color and Chemical Company as "manganese dioxide). Thereafter, these reagents were mixed by tumbling them for two hours at a speed of 30 revolutions per minute.

The mixture thus produced was then charged to a 9"×12" cylindrical crucible comprised of 90 percent alumina; this crucible was obtained from the Ferro Corporation of Crooksville, Ohio. The crucible containing the glass batch was then charged to a Harper Furnace, model number H4S121412EKA30S (manufactured by the Harper Electric Furnace Corporation of Lancaster, N.Y.); both the crucible and the furnace were preheated to a temperature of 1,400 degrees Centigrade prior to the time the batch was charged to the crucible or placed into the furnace.

The glass batch was heated at 1,400 degrees Centigrade for 4.0 hours. At the end of this time, a fiber was pulled from the glass batch to check that the material was fully smelted and in solution. Thereafter, the material was poured from the crucible into a thirty-gallon quenching kettle at a temperature of 55 degrees Fahrenheit which was filled with 25 gallons of water, thereby quenching the molten glass.

Water was removed from the kettle, and the quenched frit was then dried in the kettle to a moisture content of less than 1.0 weight percent.

To a number 2 jar mill (manufactured by U.S. Stoneware Corporation of Mahwah, N.J.) were charged 100 parts of the dried frit, 7 parts of black label ball clay (sold by the Ferro Corporation of Cleveland, Ohio), 40 parts of number 3 glass sand, 0.155 parts of sodium nitrite (sold by the Interstate Chemical Corporation as sodium nitrite), 0.155 parts of anhydrous borax, and 44 parts of deionized water. The total weight of the charge to the jar mill, dry basis, 3,234 grams; the grinding media used was 6,600 grams of 1.25 inch high-density alumina balls and 3,300 grams of 1.0 inch high-density alumina balls. The mixture was then milled at a rate of 34 revolutions per minute for two hours.

The slurry thus produced was checked for particle size distribution by passing it through a series of 100 mesh Tyler and 325 mesh Tyler steel sieves; 20 weight percent of the particles in the slurry were retained on the 100 mesh sieve, and 75 percent of the particles were retained on the 325 mesh sieve.

Deionized water was added to the slurry until its specific gravity was 1.78. Thereafter, the slurry was placed into a DeVilbiss JGV560 Spray Gun (manufactured by the DeVilbiss Company of Toledo, Ohio).

A 6"×6"×0.5" thick steel plate (SA285, Grade B steel, manufactured by the Lukens Steel Corporation of West Virginia) was used as the substrate for the slurry. Before deposition, the plate was grit blasted with minus 40 mesh alumina at 80 pounds per square inch until a clean sample was obtained. Thereafter, the clean sample was sprayed with the ground coat slurry material until a wet film with a wet film thickness of 0.62 millimeters was obtained. The coated substrate was then allowed to air dry under ambient conditions for 2.0 hours.

The dried plate was then charged to Cooley BL4 Electric Furnace which had been preheated to a temperature of 870 degrees Centigrade. The plate was subjected to this temperature for a period of 40 minutes. Thereafter, it was removed from the furnace and allowed to cool to ambient.

Thereafter, an intermediate coat was prepared in substantial accordance with the aforementioned procedure for application to the once-coated plate. To the aforementioned Curtis Tumbling Mill was charged 9.09 parts of the aforementioned feldspar, 1.52 parts of calcium carbonate (sold by the General Color and Chemical Corporation as "whiting Genco number 6"), 3.57 parts of magnesium carbonate (sold by the General Color and Chemical Corporation as magnesium carbonate), 4.24 parts of potassium nitrite (sold by Interstate Chemical Company as potassium nitrite), 5.00 of sodium nitrate (sold by the General Color and Chemical Corporation as sodium nitrate), 16.79 parts of the aforementioned sodium carbonate, 5.9 parts of zirconium silicate (sold by the Tam Ceramic Products Corporation of Niagara Falls, N.Y. as "Zircosil"), 2.17 parts of the aforementioned anhydrous borax, 4.2 parts of lithium carbonate (sold by the General Color and Chemical Corporation as lithium carbonate), 62.18 parts of the aforementioned quartz, 1.0 parts of the aforementioned cobalt oxide, and 1.2 parts of black iron oxide, specification BK5099 (sold by the General Color and Chemical Corporation). The mixture was then mixed for 2.0 hours at a speed of 30 revolutions per minute.

The mixture thus produced was charged to a crucible comprised of 90 percent alumina; this crucible was obtained from the Ferro Corporation of Crooksville, Ohio. The crucible containing the glass batch was then charged to a Harper Furnace, model number H4S121412EKA30S (manufactured by the Harper Electric Furnace Corporation of Lancaster, N.Y.); both the crucible and the furnace were preheated to a temperature of 1,400 degrees Centigrade prior to the time the batch was charged to the crucible or placed into the furnace.

The glass batch was heated at 1,400 degrees Centigrade for 4.0 hours. At the end of this time, a fiber was pulled from the glass batch to check that the material was fully smelted and in solution. Thereafter, the material was poured from the crucible into a thirty-gallon quenching kettle at a temperature of 55 degrees Fahrenheit which was filled with 25 gallons of water, thereby quenching the molten glass.

Water was removed from the kettle, and the quenched frit was then dried in the kettle to a moisture content of less than 1.0 weight percent.

To a number 2 jar mill (manufactured by U.S. Stoneware Corporation of Mahwah, N.J.) were charged 100 parts of the dried frit, 5.0 parts of "Refrasil" Standard Fibers (sold by the Carborundum Corporation of Niagara Falls, N.Y. as "Standard Fiber F100-A25), 0.62 parts of purified Wyoming bentonite (sold by the Ferro Corporation of Cleveland, Ohio), 0.62 parts of potassium chloride (sold by the General Color and Chemical Corporation as potassium chloride), and 35 parts of deionized water. The total weight of the charge to the jar mill, dry basis, was 2,334.8 grams; the grinding media used was 6,600 grams of 1.25 inch high-density alumina balls and 3,300 grams of 1.0 inch high-density alumina balls. The mixture was then milled at a rate of 34 revolutions per minute for two hours. The slurry thus produced was checked for particle size distribution by passing it through a series of 100 mesh Tyler and 325 mesh Tyler steel sieves; 10 weight percent of the particles in the slurry were retained on the 100 mesh sieve, and 80 percent of the particles were retained on the 325 mesh sieve.

Deionized water was added to the slurry until its specific gravity was 1.82, and thereafter denatured ethyl alcohol was added to adjust the specific gravity to 1.72. Thereafter, the slurry was placed into the aforementioned DeVilbiss JGV560 Spray Gun.

The aforementioned, ground-coated 6"×6"×0.5" thick steel plate was used as the target. The sample was sprayed with the intermediate coat slurry material until a wet film with a wet film thickness of 0.75 millimeters was obtained. The coated substrate was then allowed to air dry under ambient conditions for 2.0 hours.

The dried plate was then charged to Cooley BL4 Electric Furnace which had been preheated to a temperature of 810 degrees Centigrade. The plate was subjected to this temperature for a period of 40 minutes. Thereafter, it was removed from the furnace and allowed to cool to ambient.

Thereafter, a cover coat was applied to the twice-coated plate in substantial accordance with the procedure used for the application of the intermediate coat with the following exceptions: (1) no amorphous silica fibers were charged to the ball mill, and (2) the firing temperature used was 790 degrees Centigrade.

The cooled, thrice-coated plate was then evaluated in accordance with the test procedures described in this specification.

The plate was checked for electrical conductivity using the 20,000 volt test procedure; the plate was an effective insulator.

The coating thickness of the sample was measured by a Fisher Deltascope thickness meter, and the mean thickness was found to be 1.39 millimeters with a range of 1.28 to 1.52 millimeters and a standard deviation of 3.8; 32 readings were taken.

The sample was tested in accordance with the impact resistance test described in the specification. The sample was tested by the aforementioned Electric Spark Test, using 20,000 volts; electrical contact occurred at an energy of 1.57 joules.

EXAMPLE 2

In substantial accordance with the procedure of Example 1, a coated plate was prepared with the exception that no fiber material was charged to the ball mill; thus, no intermediate coating was used, and the cover coat used had a fired thickness of 1.0 millimeter.

The fired plate was tested in accordance with the procedure of Example 1. When tested in accordance with the 20,000 volt apparatus, it was found that the first contact occurred at a ball drop energy of 0.98 joules.

EXAMPLE 3

In substantial accordance with the procedure of Example 1, a thrice-coated plate was prepared; this plate had a thickness of 0.90 inches and a diameter of 3.5 inches so it could be tested by the aforementioned DIN 2743 test for hydrochloric acid vapor resistance. When tested in accordance with this procedure, the plate lost only 0.28 grams per square meter per day of coating.

EXAMPLE 4

The procedure of Example 3 was substantially repeated with the exception that no amorphous fiber was added to the cover coat; thus, no intermediate coat was used, and a cover coat with a thickness of 1.0 millimeters was applied.

The coated plate was tested for acid resistance in accordance with the DIN 2743 procedure (vapor phase, 20 percent hydrochloric acid). When tested in accordance with this procedure, it was found that the plate lost only 0.28 grams per square meter per day of coating.

Comparative Example 5

The procedure of Example 1 was substantially followed, with the exception that the amorphous silica fibers were replaced by an equal concentration "M Grade" Silicon Carbide Whiskers (sold by Advanced Refractories Technologies, Inc. of Buffalo, N.Y.); these fibers had an aspect ratio of from 10–25.

Upon firing the intermediate layer, the silicon carbide fibers decomposed, forming a glass, sponge-like matrix.

EXAMPLE 6

In substantial accordance with the procedure of Example 1, a coated substrate was prepared, with the exceptions that (1) the target used was a convex-shaped steel substrate (SA-285), (2) the intermediate coating was made from a glass batch which comprised 2.3 parts of potassium oxide, 15.3 parts of sodium oxide, 4.0 parts of barium oxide, 1.0 parts of calcium oxide, 1.3 parts of zinc oxide, 2.6 parts of lithium oxide, 69.8 parts of silica, and 3.7 parts of alumina. The coated and fired substrate had properties comparable to the coated and fired substrate of Example 1.

Comparative Example 7

In substantial accordance with the procedure of Example 6, a coated substrate was prepared with the exception that no amorphous silica fibers were charged to the ball mill. The coated and fired substrate had properties comparable to the coated and fired substrate of Example 2.

Having thus described my invention in detail by means of numerous embodiments thereof in the foregoing specification.

I claim:

1. A process for preparing a chemically-resistant coating upon a substrate, comprising the steps of sequentially:

(a) contacting said substrate with a first slurry to produce a first coated substrate with a wet film thickness of from about 0.3 to about 0.75 millimeters, wherein:

1. said first slurry contains from about 60 to about 70 weight percent of solid material [and has] *comprising glass frit having* a particle size distribution such that at least about 5 weight percent of the particles in said first slurry are smaller than 44 microns and at least about 20 weight percent of the particles in said first slurry are larger than 150 microns, 2. said solid material in said *glass frit in said* first slurry is comprised of, by weight of dry solid material, from about 48 to about 58 weight percent of silica, from about 12 to about 22 weight percent of boric oxide, from about 1 to about 9 weight percent of potassium oxide, and from about 1 to about 9 weight percent of alumina, (b) drying said once coated substrate to a moisture content of less than about 10 weight percent, thereby producing a once dried substrate, (c) subjecting said once dried substrate to a temperature of from about 810 to about 910 degrees Centigrade for at least about 20 minutes, thereby producing a once fired substrate, (d) contacting said once fired substrate with a second slurry to produce a second coated substrate with a wet film thickness of from about 0.75 to about 1.5 millimeters, wherein:

1. said second slurry is comprised of from about 60 to about 75 weight percent solid material and has a particle size distribution such that at least 10 weight percent of the particles in such second slurry are larger than 150 microns and less than about 10 percent of the particles in such second slurry are smaller than 44 microns, 2. said solid material in said second slurry is comprised of from about 2 to about 10 weight percent of inorganic fiber by total weight of solid material and at least about 90 weight percent of frit, wherein:

(a) said frit is comprised, by dry weight of frit, of from about 68 to about 74 weight percent of silica, from about 0.5 to about 2.5 weight percent of alumina, from about 7 to about 15 weight percent of sodium oxide, from about 1 to about 5 weight percent of lithium oxide, and from about 2 to about 9 weight percent of zirconium oxide, (b) said inorganic fiber has a softening point in excess of 950 degrees Centigrade, an average length of from about 100 to about 750 microns, an average diameter of from about 5 to about 15 microns, and an average aspect ratio of from about 10:1 to about 75:1, (e) drying said twice coated substrate to a moisture content of less than about 10 weight percent, thereby producing a twice dried substrate, (f) subjecting said twice dried substrate to a temperature of from about 750 to about 850 degrees Centigrade for at least about 20 minutes, thereby producing a twice fired substrate, (g) contacting said twice fired substrate with a thrice slurry which is substantially identical to said twice slurry with the exception that it does not contain any of said inorganic fiber, wherein to produce a thrice coated substrate with a wet film thickness of from about 0.75 to about 1.5 millimeters, wherein 1. said third slurry is comprised of from about 60 to about 75 weight percent solid material and has a particle size distribution such that at least 10 weight percent of the particles in such third slurry are larger than 150 microns and less than about 10 percent of the particles in such third slurry are smaller than 44 microns, (h) drying said thrice coated substrate to a moisture content of less than about 10 weight percent, thereby producing a thrice dried substrate, and (i) subjecting said thrice dried substrate to a temperature of from about 740 to about 840 degrees Centigrade for at least about 20 minutes.

2. The process as recited in claim 1, wherein each of said first slurry, said twice slurry, and said thrice slurry is comprised of water.

3. The process as recited in claim 1, wherein said solid material in said first slurry is comprised of from about 1 to about 6 weight percent of cobalt oxide.

4. The process as recited in claim 1, wherein said solid material in said first slurry is comprised of from about 0.2 to about 4 weight percent of nickel oxide.

5. The process as recited in claim 1, wherein each of said first slurry, said twice slurry, and said thrice slurry is contacted with said substrate by spraying it onto said substrate.

6. The process as recited in claim 1, wherein said inorganic fiber consists essentially of amorphous silica.

7. The process as recited in claim 6, wherein said inorganic fiber has a coefficient of thermal expansion of from about 0 to about 20×0.0000001 centimeters per centimeter per degree Centigrade.

8. The process as recited in claim 6, wherein said inorganic fiber has a coefficient of thermal expansion of from about 4 to about 10×0.0000001 centimeters per centimeter per degree Centigrade.

9. The process as recited in claim 6, wherein said inorganic fiber has an aspect ratio of from about 15:1 to about 25:1.

10. The process as recited in claim 1, wherein said substrate is comprised of a substantially planar surface.

11. The process as recited in claim 1, wherein said substrate is comprised of a substantially concave surface.

12. The process as recited in claim 1, wherein said substrate is comprised of a substantially convex surface.

13. The process as recited in claim 1, wherein said twice slurry is comprised of an alcohol of the formula ROH wherein R is lower alkyl containing from about 1 to about 3 carbon atoms.

14. The process as recited in claim 13, wherein said thrice slurry is comprised of an alcohol of the formula ROH wherein R is lower alkyl containing from about 1 to about 3 carbon atoms.

15. The process as recited in claim 14, wherein said alcohol is ethanol.

* * * * *